United States Patent
Sato et al.

(10) Patent No.: US 9,965,485 B2
(45) Date of Patent: May 8, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Mitsuru Sato, Yokohama (JP); Masaya Kojima, Yokohama (JP); Kosuke Kubota, Yokohama (JP); Kunihiko Hayashi, Yokohama (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days. days.

(21) Appl. No.: 14/597,418

(22) Filed: Jan. 15, 2015

(65) Prior Publication Data

US 2016/0048530 A1 Feb. 18, 2016

(30) Foreign Application Priority Data

Aug. 15, 2014 (JP) ................................. 2014-165462

(51) Int. Cl.
*G06F 17/30* (2006.01)
*G06F 3/0484* (2013.01)
*G06F 3/0482* (2013.01)

(52) U.S. Cl.
CPC ...... *G06F 17/30126* (2013.01); *G06F 3/0482* (2013.01); *G06F 3/04842* (2013.01); *G06F 17/3028* (2013.01); *G06F 17/30115* (2013.01)

(58) Field of Classification Search
None
See application file for complete search history.

(56) References Cited

U.S. PATENT DOCUMENTS

| | | | | |
|---|---|---|---|---|
| 6,801,949 B1 * | 10/2004 | Bruck | ............... | H04L 29/12009 709/232 |
| 2004/0257343 A1 * | 12/2004 | Ito | ........................ | G06F 3/0482 345/173 |
| 2007/0030360 A1 * | 2/2007 | Udono | ................. | H04N 1/2112 348/231.99 |
| 2008/0201097 A1 * | 8/2008 | Stromberg | ........... | G01B 11/272 702/94 |
| 2008/0307350 A1 * | 12/2008 | Sabatelli | ............... | G06F 3/0481 715/779 |
| 2013/0024815 A1 * | 1/2013 | O | ..................... | H04M 1/72586 715/811 |

* cited by examiner

*Primary Examiner* — Edward Martello
(74) *Attorney, Agent, or Firm* — Sughrue Mion, PLLC

(57) ABSTRACT

An information processing apparatus includes a first display controller, an accepting unit, a grouping unit, and a memory controller. The first display controller controls a display to display plural images representing respective files. The accepting unit accepts an operation for selecting at least two or more images from among the plural images. The grouping unit forms a group by associating plural files represented by the at least two or more images with one another with the at least two or more images kept displayed on the display in a case where the accepting unit has accepted the operation. The memory controller controls a memory to store information indicating display positions of the at least two or more images on a screen in association with the group that has been formed by the grouping unit.

4 Claims, 11 Drawing Sheets

| GROUP ID | FILE ID | ORDER | RELATED FILE | RELATIONSHIP TYPE |
|---|---|---|---|---|
| group1 | file1 | A | file2 | REVISED |
| | file2 | B | file1 | REVISED |
| | file3 | C | – | – |
| | ... | ... | ... | ... |

US 9,965,485 B2

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-165462 filed Aug. 15, 2014.

BACKGROUND (i) Technical Field

The present invention relates to an information processing apparatus, an information processing method, and a non-transitory computer readable medium.

(ii) Related Art

Hitherto, systems for managing multiple files have been proposed.

SUMMARY

According to an aspect of the invention, there is provided an information processing apparatus including a first display controller, an accepting unit, a grouping unit, and a memory controller. The first display controller controls a display to display plural images representing respective files. The accepting unit accepts an operation for selecting at least two or more images from among the plural images. The grouping unit forms a group by associating plural files represented by the at least two or more images with one another with the at least two or more images kept displayed on the display in a case where the accepting unit has accepted the operation. The memory controller controls a memory to store information indicating display positions of the at least two or more images on a screen in association with the group that has been formed by the grouping unit.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below with reference to the drawings.

1. Exemplary Embodiment

Figures 1, 2:
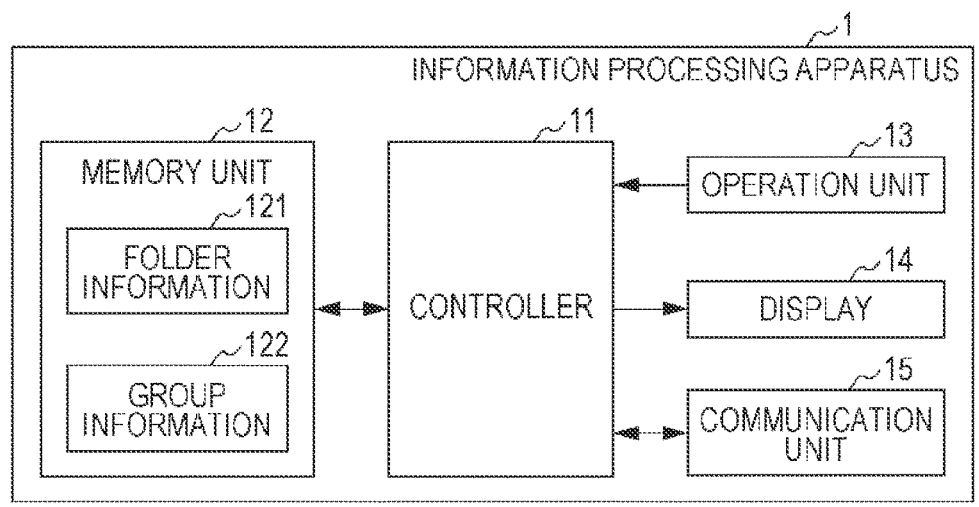
FIG. 1 is a block diagram illustrating an example of a hardware configuration of an information processing apparatus.
FIG. 2 illustrates an example of a data structure of folder information.

FIG. 1 is a block diagram illustrating an example of a hardware configuration of an information processing apparatus 1. The information processing apparatus 1 is, for example, a personal computer. More specifically, the information processing apparatus 1 may be a desktop computer or a mobile terminal such as a smartphone or a tablet terminal.

As illustrated in FIG. 1, the information processing apparatus 1 includes a controller 11, a memory unit 12, an operation unit 13, a display 14, and a communication unit 15.

The controller 11 includes, for example, a central processing unit (CPU), a read only memory (ROM), and a random access memory (RAM). The CPU loads a program from the ROM or the memory unit 12 into the RAM and executes the program.

The memory unit 12 is, for example, a storage device such as a flash memory or a hard disk drive (HDD). The memory unit 12 may be a storage device, such as a memory card, that is removable from the information processing apparatus 1. The memory unit 12 stores a file management application (described later) and various files. In this exemplary embodiment, examples of files include document files, image files, audio files, and movie files.

The memory unit 12 also stores folder information 121 that is information related to each folder used to organize and manage files. FIG. 2 illustrates an example of a data structure of the folder information 121. As illustrated in FIG. 2, the folder information 121 includes a folder ID field, a file ID field, and a coordinate information field.

The folder ID field stores identification information of a folder. The file ID field stores identification information of each file stored in the folder. The coordinate information field stores information representing a (relative or absolute) position at which an icon of the file is displayed in a workspace for the folder when the workspace for the folder is displayed on the display 14. An icon serves as an example of an "image" in accordance with an exemplary embodiment of the present invention.

The memory unit 12 also stores group information 122 used to manage files grouped within a folder. Note that the term "to group" refers to "to form a group". The term "to form a group" refers to "to associate directly or indirectly objects (e.g., files) with one another by using some kind of information".

Figures 3, 4:
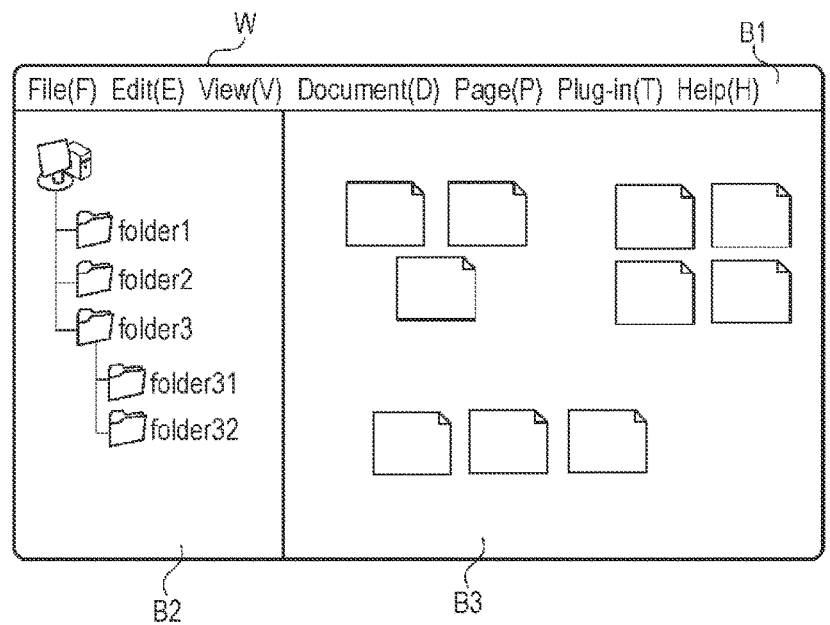
FIG. 3 illustrates an example of a data structure of group information.
FIG. 4 illustrates an example of a graphical user interface (GUI) provided by a display.

FIG. 3 illustrates an example of a data structure of the group information 122. As illustrated in FIG. 3, the group information 122 includes a group ID field, a file ID field, an order information field, a related file information field, and a relationship type information field.

The group ID field stores identification information of a group. The file ID field stores identification information of each file belonging to the group. The order information field stores information representing the order of the file in the group. The related file information field stores information identifying another file related to the file. The relationship type information field stores information representing the relationship type. The order information, the related file information, and the relationship type information will be described later in relation to a function for displaying a relationship between files.

The group information 122 is stored in association with a folder that stores files belonging to the group. Specifically, the group information 122 is stored in the folder as a hidden file.

The operation unit 13 includes, for example, a device such as a touch sensor, a keyboard, or a mouse. The operation unit 13 accepts various operations performed by a user.

The display 14 is, for example, a display device such as a liquid crystal display. The display 14 may be not necessarily integrally formed in the information processing apparatus 1. The display 14 provides a GUI as a result of the CPU executing the aforementioned file management application.

FIG. 4 illustrates an example of the GUI provided by the display 14. A window W including a menu bar B1, a folder portion B2, and a workspace portion B3 is displayed on the screen as the GUI illustrated in FIG. 4. In the folder portion B2, a tree of folders each storing a group of files managed by the file management application is displayed. In the workspace portion B3, images representing files stored in a folder that is selected by a user in the folder portion B2 are displayed. For example, icons are displayed as the images representing files. For example, thumbnail images are displayed as the icons. A thumbnail image is a reduced-size image of content represented by a file. Display positions of the icons in the workspace portion B3 are determined based on the coordinate information included in the folder information 121.

The communication unit 15 is, for example, a communication interface such as a data communication card. The communication unit 15 performs data communication with an external apparatus via a communication network.

Figure 5:
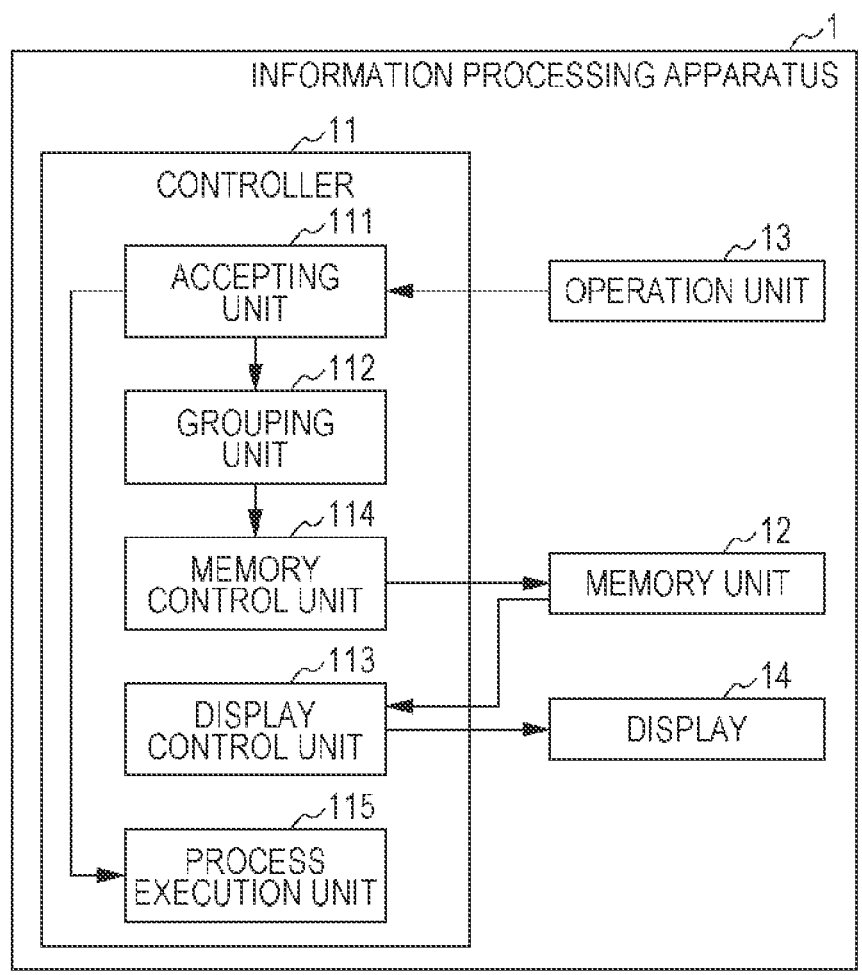
FIG. 5 is a block diagram illustrating an example of a functional configuration implemented by a controller.

FIG. 5 is a block diagram illustrating an example of a functional configuration implemented by the controller 11. The controller 11 implements functions of an accepting unit 111, a grouping unit 112, a display control unit 113, a memory control unit 114, and a process execution unit 115 by executing a program stored in the memory unit 12.

The accepting unit 111 accepts operation information indicating an operation which the user has performed by using the operation unit 13. The grouping unit 112 associates multiple files with one another so as to form a group. More specifically, the grouping unit 112 directly or indirectly associates multiple files with one another by using some kind of information so as to form a group. The display control unit 113 controls the display 14 to display icons of files and various kinds of information. The memory control unit 114 controls the memory unit 12 to store the folder information 121 and the group information 122. The process execution unit 115 executes various processes in accordance with operation information accepted by the accepting unit 111.

The individual functions will be described in detail later in relation to functions of the file management application.

Individual functions of the file management application which is a feature of this exemplary embodiment will be described. Specifically, a function for setting a group on a file-by-file basis (hereinafter, referred to as a "file-based group setting function), a function for displaying a relationship between files (hereinafter, referred to as a "file relationship display function"), a function enabling arrangement on a group-by-group basis (hereinafter, referred to as a "group-based arrangement function"), a function enabling coordination with a binder or the like (hereinafter, referred to as a "coordination-with-binder function"), and a group management function will be described.

(1) File-based Group Setting Function

The file management application implements a function for setting a group on a file-by-file basis (i.e., the file-based group setting function).

Figure 6:
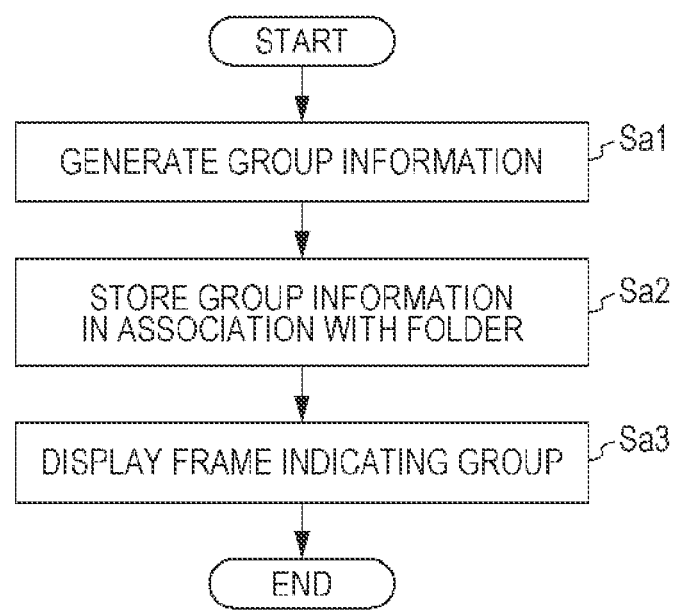
FIG. 6 is a flowchart illustrating an example of a group setting process.

FIG. 6 is a flowchart illustrating an example of a group setting process. The group setting process is executed upon the accepting unit 111 of the controller 11 accepting an operation for selecting icons of files to be grouped, for example. This operation may be performed, for example, in such a manner that given icons are selected on the screen illustrated in FIG. 4 and an item for grouping is selected in the menu. The operation for selecting an icon may be, for example, an operation for tapping a touch sensor at a position corresponding to the icon with an object such as a finger, or an operation for clicking a mouse after placing a cursor at the icon. In addition, the menu is a list of operation items displayed on the display 14. The item for grouping is an operation item indicating an operation for giving an instruction to group files. Further, the operation for selecting the item for grouping may be, for example, an operation for tapping the touch sensor at a position corresponding to the item with an object such as a finger, or an operation for clicking a mouse after placing a cursor at the item.

In step Sa1, the grouping unit 112 of the controller 11 groups files. Specifically, the grouping unit 112 groups files by generating the group information 122 for a group newly formed. More specifically, the grouping unit 112 assigns a group ID to a group newly formed and associates IDs of files to be grouped with this group ID so as to generate the group information 122. In this way, the grouping unit 112 groups the files. The display control unit 113 of the controller 11 performs control so that the icons of the files to be grouped are kept displayed on the screen during this process.

In step Sa2, the memory control unit 114 of the controller 11 performs control to store the generated group information 122 in association with a folder that stores the files that have been grouped. Specifically, the memory control unit 114 performs control to store the group information 122 in the folder as a hidden file. At this time, the group information 122 and coordinate information for icons are indirectly associated with each other and are stored because the folder information 121 for the folder includes the coordinate information for icons of grouped files.

Figure 7:
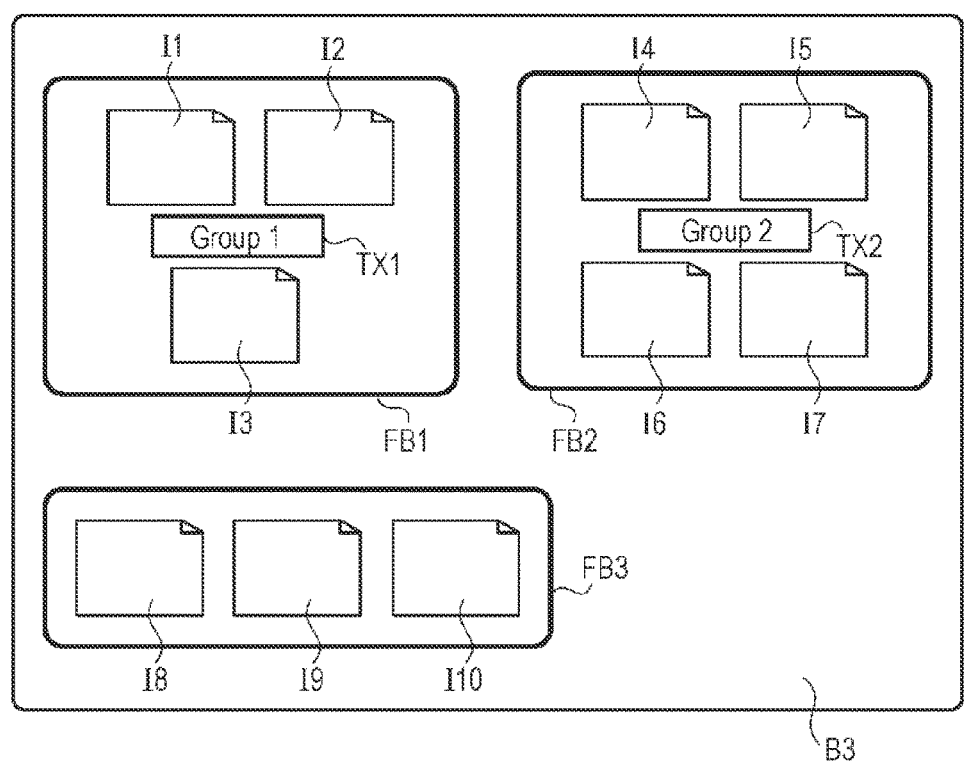
FIG. 7 illustrates an example of a displayed screen.

After the files have been grouped in this way, the display control unit 113 performs control to display a frame that surrounds the icons of the files that have been grouped, in step Sa3. FIG. 7 illustrates an example of a screen in which the frame is displayed. In the screen illustrated in FIG. 7, a frame FB1 that surrounds icons I1 to I3 indicates that files represented by the icons I1 to I3 form one group. A frame FB2 that surrounds icons I4 to I7 indicates that files represented by the icons I4 to I7 form another group. A frame FB3 that surrounds icons I8 to I10 indicates that files represented by the icons I8 to I10 form another group.

The description above is regarding the group setting process.

In the case of newly adding a file to a group that has been already formed, a user may perform an operation for dragging an icon of the newly added file and dropping the icon of the file within the frame of the target group. If the accepting unit 111 accepts this operation, the grouping unit 112 may associate an ID of the newly added file with the group ID in the group information 122 of the target group.

A group name may be set for a group that has been formed and may be displayed on the screen. Text TX1 illustrated in FIG. 7 represents a name of the group identified by the frame FB1, whereas text TX2 illustrated in FIG. 7 represents a name of the group identified by the frame FB2. A name of a group may be set manually by a user or automatically based on content of the files that have been grouped. Information on the name may be stored as part of the group information 122.

In addition, files that have been grouped may be set to be movable on a group-by-group basis. For example, in the case where a frame for a group is selected and dragged, files belonging to the group may be collectively moved as a group. Specifically, upon the accepting unit 111 accepting this operation, the display control unit 113 performs control to move icons of the files belonging to the group corresponding to the selected frame. At that time, the display control unit 113 performs control to move the displayed frame and icons while maintaining a relative positional relationship between the frame and each icon.

According to the file-based group setting function described above, icons of files to be grouped are kept displayed when a group is set. In contrast, according to a group setting method using a folder, an icon of a folder is displayed in place of icons of files to be grouped as a result of storing the files to be grouped in the folder. In order to display a list of icons of the files stored in the folder, an operation for opening the folder is needed.

(2) File Relationship Display Function

The file management application implements a function for displaying a relationship between files (i.e., the file relationship display function). For example, a function for displaying a relationship between files that have been grouped is implemented.

Figure 8:
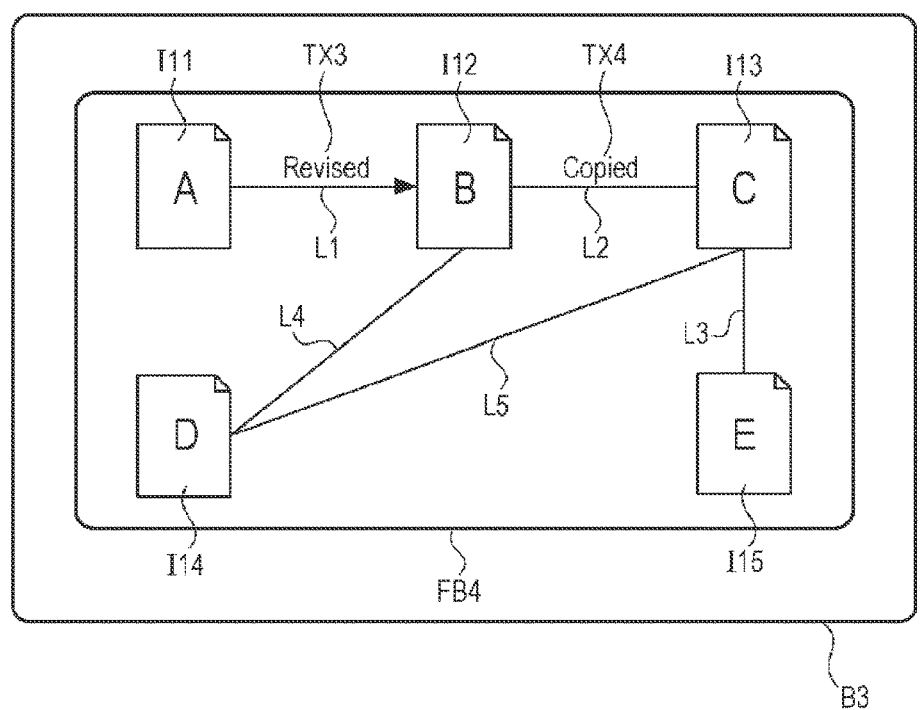
FIG. 8 illustrates an example of a displayed screen.

FIG. 8 illustrates an example of a screen displaying a relationship between files that have been grouped. Alphabets "A" to "E" of icons I11 to I15 illustrated in FIG. 8 indicate the order assigned to the individual files in the group. This order is set, for example, by a user. Upon the accepting unit 111 of the controller 11 accepting information indicating the order (hereinafter, referred to as order information), the memory control unit 114 of the controller 11 performs control to store the order information as part of the group information 122 of the group. Based on the order information stored in the group information 122, the display control unit 113 of the controller 11 performs control to display the icons indicating the order.

Note that the order indicated by the icons is not limited to that based on alphabets and the order may be indicated by signs of another type, such as numerals.

Linking lines L1 to L5 illustrated in FIG. 8 serve as relationship information indicating that files are related to each other. For example, the linking line L1 indicates that files represented by the icons I11 and I12 are related to each other. In addition, text TX3 and text TX4 illustrated in FIG. 8 serve as relationship type information indicating a relationship type. The text TX3 arranged along the linking line L1 indicates that a relationship between the files represented by the icons I11 and I12 is that one of the files is an original and the other is a revised version of the original. The text TX4 arranged along the linking line L2 indicates that a relationship between files represented by the icons I12 and I13 is that one of the files is an original and the other is a copy of the original.

The linking lines L1 to L5 (i.e., the relationship information) are displayed based on the related file information stored in the group information 122. For example, according to the group information 122 illustrated in FIG. 3, "file 2" is associated with "file 1" in the related file information field. Thus, a linking line is displayed between an icon of "file 1" and an icon of "file 2". The texts TX3 and TX4 (i.e., the relationship type information) are displayed based on the relationship type information stored in the group information 122. For example, according to the group information 122 illustrated in FIG. 3, "REVISED" is associated with "file 1" as the relationship type information. Thus, text "Revised" is displayed along the linking line that links the icon of "file 1" to the icon of "file 2".

The related file information and the relationship type information are set, for example, by a user. Upon the accepting unit 111 of the controller 11 accepting these information items, the memory control unit 114 of the controller 11 performs control to store the information items as part of the group information 122 for the group. The display control unit 113 of the controller 11 performs control to display the relationship information and the relationship type information respectively based on the related file information and the relationship type information that are stored in the group information 122.

Alternatively, the related file information and the relationship type information may be set in response to a predetermined process without waiting for any explicit instruction from a user. For example, the related file information indicating a relationship between the files represented by the icons I12 and I13 illustrated in FIG. 8 and the relationship type information indicating the type of the relationship may be stored under control of the memory control unit 114 and displayed under control of the display control unit 113 upon creation of the file represented by the icon I13 by copying the file represented by the icon I12.

In the case where a given icon is selected and a given process is selected when the screen illustrated in FIG. 8 is displayed, the similar process may be executed for a file related to the file represented by the icon. Also, in the case where a linking line is selected and a given process is selected in the similar state, the selected process may be executed for files represented by icons linked by the linking line.

For example, in the case where the icon I11 is selected on the screen illustrated in FIG. 8 and a process "open" is selected in the menu, the files represented by the icons I11 and I12 may be opened. In addition, in the case where the linking line L2 is selected on the screen illustrated in FIG. 8 and a process "copy" is selected in the menu, copy files of the files represented by the icons I12 and I13 may be created and displayed.

Upon the accepting unit 111 of the controller 11 accepting selection of an icon or linking line and selection of a given process, the process execution unit 115 of the controller 11 identifies files to be processed by referring to the related file information stored in the group information 122 and executes the process on the files that have been identified.

(3) Group-based Arrangement Function

The file management application implements a function for arranging files on a group-by-group basis (i.e., the group-based arrangement function). Specifically, a function for arranging icons of files belonging to a given group (hereinafter, referred to as "in-group arrangement") and a function for arranging icons of files in multiple groups on a group-by-group basis on the screen displaying the multiple groups (hereinafter, referred to as "group-based arrangement for all groups") are implemented.

Figure 9A:
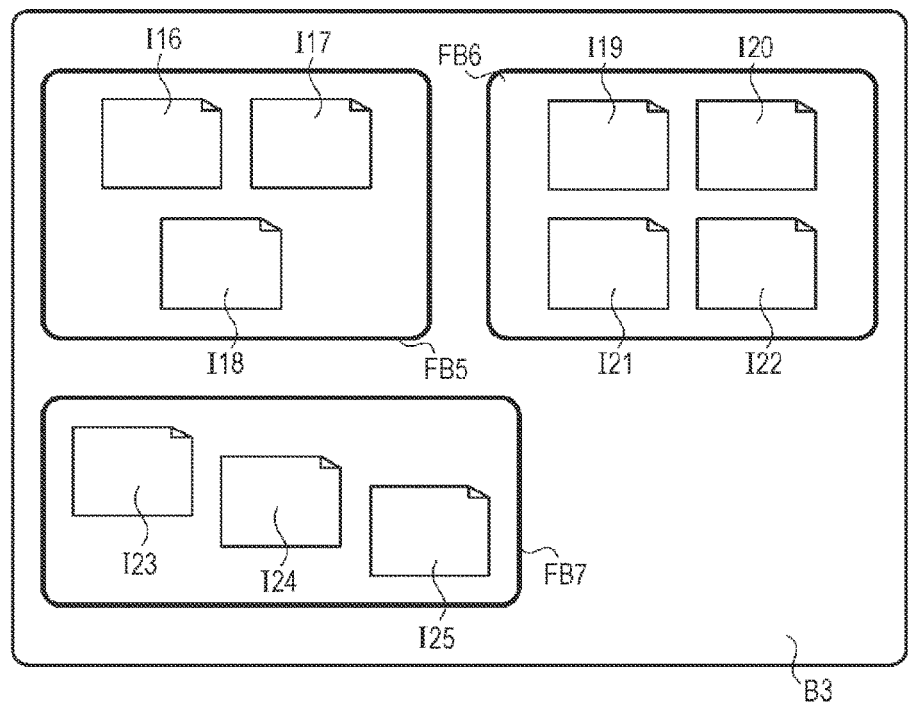
FIGS. 9A and 9B illustrate an example of a displayed screen.
Figure 9B:
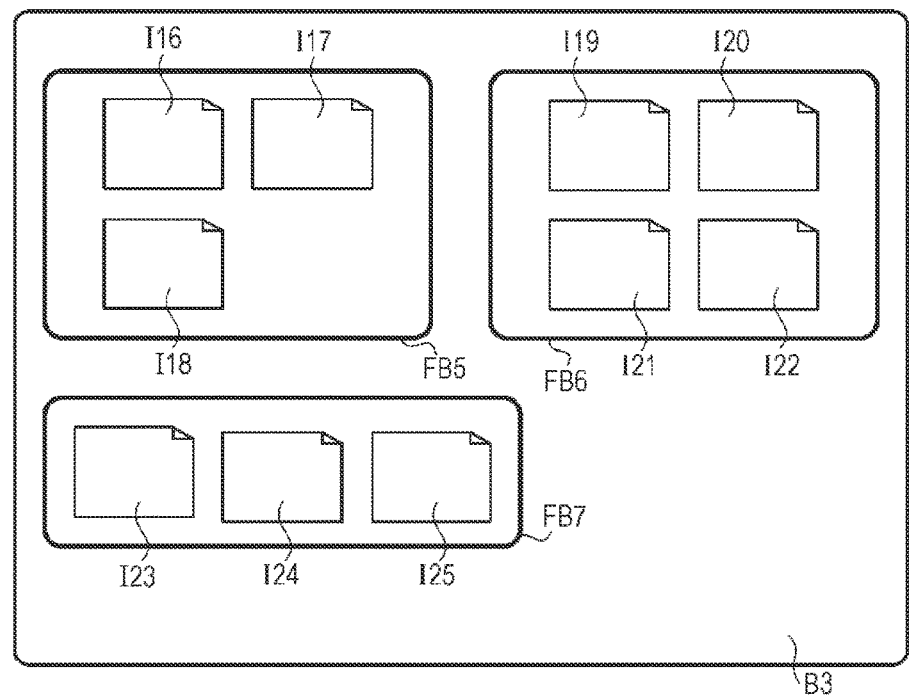

FIGS. 9A and 9B describe in-group arrangement and group-based arrangement for all groups. Specifically, FIG. 9A illustrates a screen displayed before in-group arrangement and group-based arrangement for all groups are performed, whereas FIG. 9B illustrates a screen displayed after in-group arrangement and group-based arrangement for all groups have been performed. In the example illustrated in FIGS. 9A and 9B, arrangement at even intervals is used.

Upon the accepting unit 111 of the controller 11 accepting selection of a group (i.e., a frame) and selection of in-group arrangement when the screen illustrated in FIG. 9A is displayed, the display control unit 113 of the controller 11 performs control to rearrange and display icons of files belonging to the selected group within the group in accordance with a predetermined criterion.

Upon the accepting unit 111 accepting selection of group-based arrangement for all groups when the screen illustrated in FIG. 9A is displayed, the display control unit 113 performs control to rearrange and display icons of files in individual groups in accordance with a predetermined criterion while keeping the icons displayed and maintaining, in each group, a relative positional relationship between the frame and each icon.

In the example illustrated in FIGS. 9A and 9B, arrangement at even intervals is employed; however, the type of arrangement is not limited to this arrangement. For example, arrangement may be performed based on a criterion such as the name, the size, the type, or the update date and time of files.

(4) Coordination-with-binder Function

The file management application implements a function enabling coordination with a DocuWorks (registered trademark) binder function. Specifically, functions for binding grouped files by a binder or unbinding grouped files that have been bound by a binder are implemented.

Figure 10A:
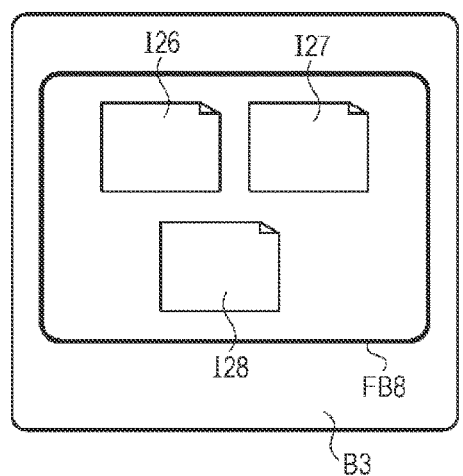
FIGS. 10A and 10B illustrate an example of a displayed screen.
Figure 10B:
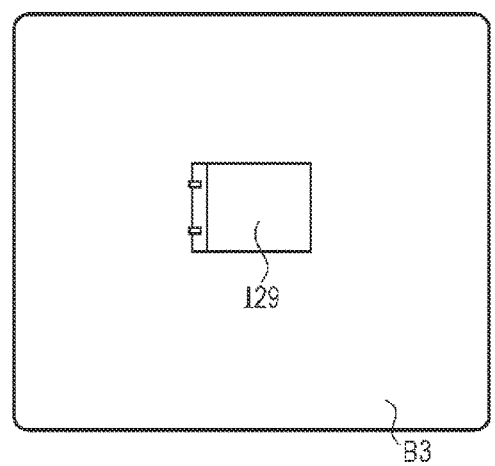

FIGS. 10A and 10B illustrate an example in which grouped files are bound by a binder. Specifically, FIG. 10A illustrates a screen displayed before files are bound by a binder, whereas FIG. 10B illustrates a screen displayed after the files have been bound by the binder.

Upon the accepting unit 111 of the controller 11 accepting selection of a group (i.e., a frame FB8) and selection of a binder function when the screen illustrated in FIG. 10A is displayed, the display control unit 113 of the controller 11 performs control to display an icon I29 representing a binder that stores files represented by icons I26 to I28 in place of the frame FB8 corresponding to the group and the icons I26 to I28 surrounded by the frame FB8 as illustrated in FIG. 10B. At this time, the process execution unit 115 of the controller 11 newly assigns an ID to the binder and associates IDs of files stored in the binder with this binder ID so as to generate binder information. The memory control unit 114 of the controller 11 performs control to store, in place of the group information 122, the generated binder information in association with the folder storing the files.

Conversely, upon the accepting unit 111 accepting selection of the icon I29 representing the binder and an instruction for unbinding when the screen illustrated in FIG. 10B is displayed, the display control unit 113 performs control to display the icons I26 to I28 representing the files stored in the binder and the frame FB8 that surrounds these icons I26 to I28 in place of the icon I29 as illustrated in FIG. 10A. At this time, the process execution unit 115 newly assigns a group ID and associates IDs of the files that have been stored in the binder with this group ID so as to generate the group information 122. The memory control unit 114 performs control to store, in place of the binder information regarding the binder, the generated group information 122 in association with the folder storing the files.

In the example illustrated in FIGS. 10A and 10B, a binder is used as a function for binding files; however, a DocuWorks (registered trademark) container (specifically, a clear folder or an envelope) may be used as another example of such a function.

(5) Group Management Function

The file management application implements various functions for managing groups.

First, a subgroup may be formed within a group when groups are managed.

Figure 11:
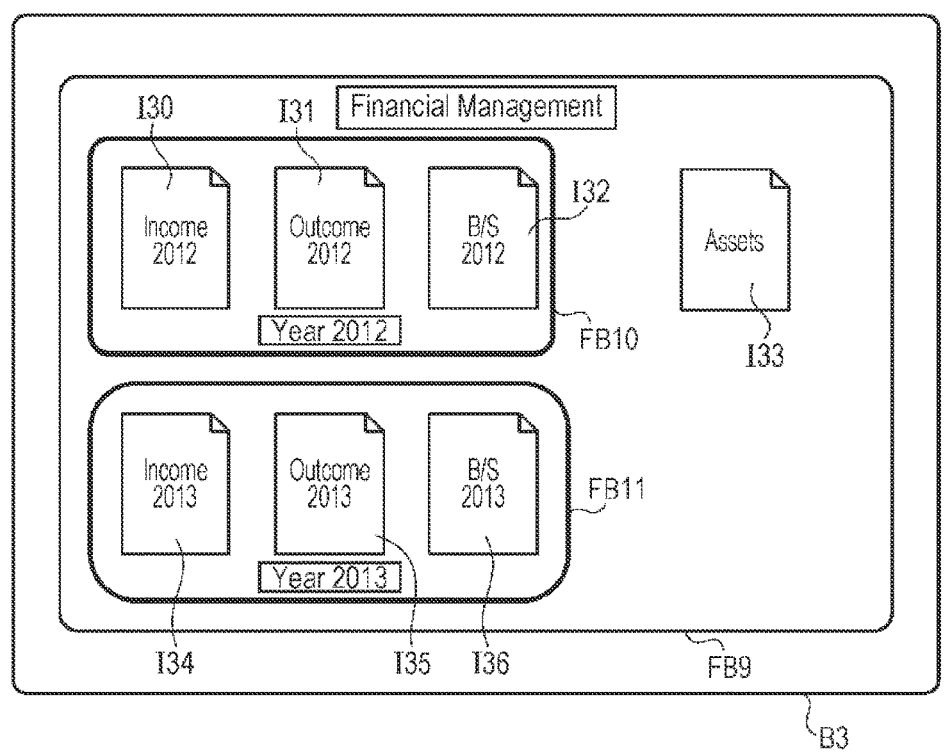
FIG. 11 illustrates an example of a displayed screen.

FIG. 11 illustrates an example of a screen that is displayed after subgroups have been formed within a group. On the screen illustrated in FIG. 11, a frame FB9 that surrounds icons I30 to I36 indicates that files represented by the icons I30 to I36 form one group. A frame FB10 that is within the frame FB9 and surrounds the icons I30 to I32 indicates that the files represented by the icons I30 to I32 form a subgroup within the group identified by the frame FB9. A frame FB11 that is within the frame FB9 and surrounds the icons I34 to I36 indicates that the files represented by the icons I34 to I36 form another subgroup within the group identified by the frame FB9.

A method for setting a subgroup illustrated in FIG. 11 is similar to the setting method that has been described in the section "(1) File-based Group Setting Function" above, and thus a description thereof is omitted.

In the case where one file belongs to multiple groups, an icon of the file may be displayed to be surrounded by multiple frames when groups are managed.

Figure 12:
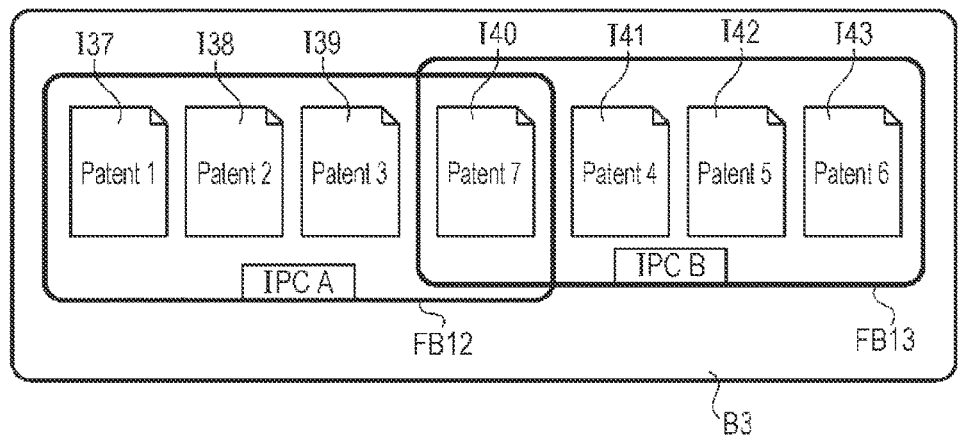
FIG. 12 illustrates an example of a displayed screen.

FIG. 12 illustrates an example of a screen in which an icon I of a file, which belongs to two groups, is surrounded by two frames FB. On the screen illustrated in FIG. 12, a frame FB12 that surrounds icons I37 to I40 indicates that files represented by the icons I37 to I40 form one group. A frame FB13 that surrounds icons I40 to I43 indicates that files represented by the icons I40 to I43 form another group. On this screen, the icon I40 is surrounded by the frame FB12 and by the frame FB13, which indicates that the file represented by the icon I40 belongs to two groups identified by the frames FB12 and FB13.

FIG. 12 illustrates a display example of icons in the case where one file belongs to two groups; however, in the case where one file belongs to three or more groups, the icon of the file may be displayed to be surrounded by three or more frames.

However, if multiple icons of files each belonging to multiple groups are displayed on the screen, display of the frames FB becomes complicated, which makes it difficult to determine the groups to which each file belongs. Therefore, a function for switching between display and non-display of the frames FB and icons I on a group-by-group basis may be provided.

Figure 13:
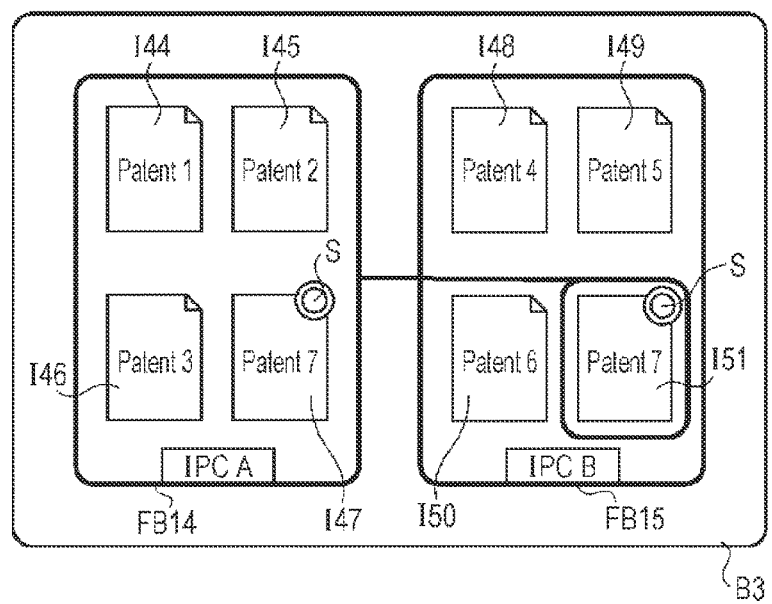
FIG. 13 illustrates an example of a displayed screen.

FIG. 13 illustrates another example of a screen in which an icon of a file, which belongs to two groups, is surrounded by two frames. On the screen illustrated in FIG. 13, a frame FB14 that surrounds icons I44 to I47 and I51 indicates that files represented by the icons I44 to I47 and I51 form one group. A frame FB15 that surrounds icons I48 to I51 indicates that files represented by the icons I48 to I51 form another group. On this screen, the icon I47 and the icon I51 are icons representing an identical file. The icon I47 is surrounded by the frame FB14, whereas the icon I51 is surrounded by the frame FB15. This indicates that the file represented by the icons I47 and I51 belongs to two groups identified by the frames FB14 and FB15.

On the screen, a sign S superimposed on the icons I47 and I51 is a sign indicating that the file represented by the icons I47 and I51 belongs to multiple groups. In the case where a file represented by icons belongs to a predetermined number of groups or more, the display control unit 113 of the controller 11 may perform control to display information indicating that the file belongs to multiple groups in association with the icons.

Note that the shape and color of the sign S are not limited to those used in the illustrated example.

In the case where plural groups are displayed on the screen and arrangement of icons of the groups is complicated, display areas for the respective groups may be made smaller when groups are managed.

Figure 14A:
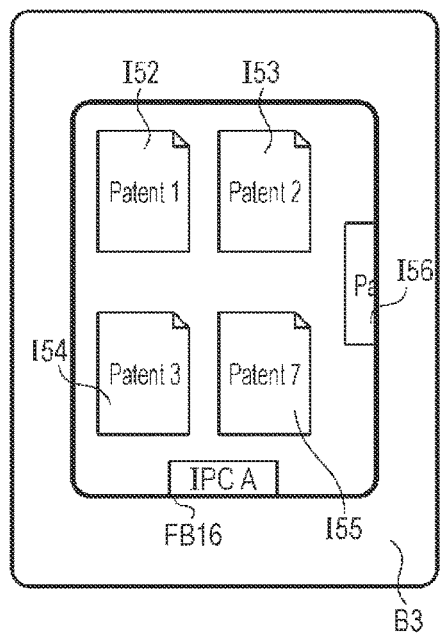
FIGS. 14A and 14B illustrate an example of a displayed screen.
Figure 14B:
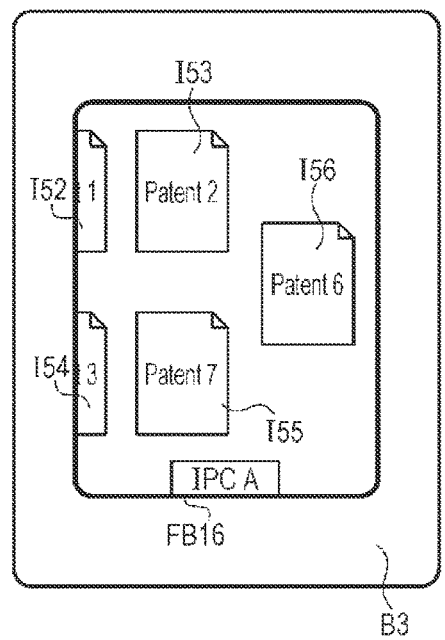

FIGS. 14A and 14B illustrate an example of a screen displayed in the case where an area outside a frame is used in order to make the display area smaller. A frame FB16 that surrounds icons I52 to I56 on the screen illustrated in FIGS. 14A and 14B indicates that files represented by the icons I52 to I56 form one group.

On the screen illustrated in FIG. 14A, the icon I56 does not fit within the area surrounded by the frame FB16. As a result, the outline of the icon I56 is partially lost. If the frame FB16 is selected and dragged toward the right when this screen is displayed, an area that does not fit within the frame FB16 and has not been displayed is displayed within the frame FB16, and consequently, the entire outline of the icon I56 is displayed as illustrated in FIG. 14B.

Note that functions for enlarging or reducing the area within the frame or for moving the area within the frame upward, downward, rightward, or leftward on the screen illustrated in FIGS. 14A and 14B may be provided. Specifically, an enlargement/reduction button or a scrollbar may be provided in an area within or outside the frame FB16.

Figure 15A:
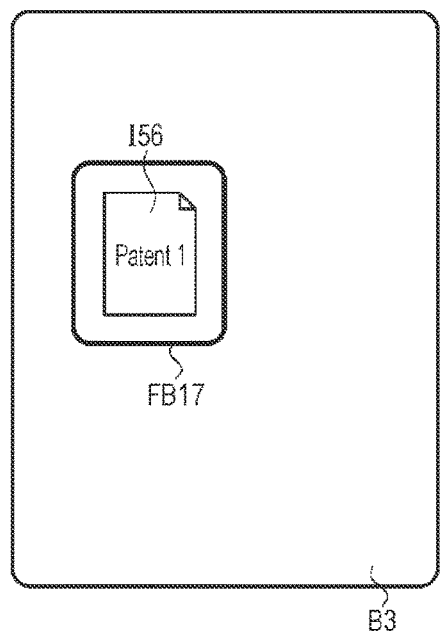
FIGS. 15A and 15B illustrate an example of a displayed screen.
Figure 15B:
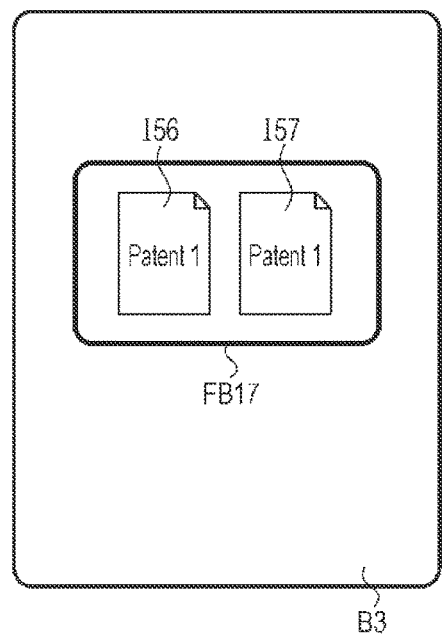

FIGS. 15A and 15B illustrate another example of a screen displayed in the case where an area outside a frame is used in order to make the display area smaller. A frame FB17 that surrounds icons I56 and I57 on the screen illustrated in FIGS. 15A and 15B indicates that files represented by the icons I56 and I57 form one group.

On the screen illustrated in FIG. 15A, the icon I57 does not fit within the area surrounded by the frame FB17. As a result, the icon I57 is not displayed. If the frame FB17 or the icon I56 is selected when the screen illustrated in FIG. 15A is displayed, an area that does not fit within the frame FB17 and has not been displayed is displayed within the frame FB17, and consequently, the icon I57 is displayed as illustrated in FIG. 15B.

In the case where an icon is hidden in an area outside a frame as in the examples illustrated in FIGS. 14A to 15B, a sticky note may be displayed in an area within or outside the frame or the color or shape of the frame may be changed from that is displayed in the case where the icon is not hidden.

2. Modifications

The exemplary embodiment described above may be modified in the following manner. Each of modifications described below may be combined with one or more other modifications.

2-1. First Modification

The exemplary embodiment may be modified such that a sign indicating that a file is being revised is superimposed on an icon of the file. Alternatively, the icon of the file may be arranged at a predetermined position within a frame to make the file being revised identifiable.

2-2. Second Modification

The shape and color of the frame described in the exemplary embodiment above are not limited to those used in the illustrated example. In addition, display of the frame may be omitted.

2-3. Third Modification

The program executed by the controller 11 of the information processing apparatus 1 in the exemplary embodiment described above may be provided after being stored on a storage medium, such as a magnetic tape, a magnetic disk, a flexible disk, an optical disc, a magneto-optical disk, or a memory. In addition, the program may be downloaded via a communication network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to execute:
   a display controller configured to control a display to display a plurality of images representing respective files;
   an accepting unit configured to accept an operation for selecting at least two or more images from among the plurality of images; and
   a grouping unit configured to form a first group by associating a plurality of files represented by the at least two or more images with one another with the at least two or more images kept displayed on the display in a case where the accepting unit has accepted the operation;
   wherein the display controller is further configured to control the display to display multiple frames surrounding an image representing a file in a case where the file belongs to multiple groups, and
   wherein the display controller is further configured to control the display to display relationship information indicating that, among the plurality of files, two or more files that satisfy a predetermined condition have a relationship and to display relationship type information indicating a type of the relationship in association with the relationship information.

2. The information processing apparatus according to claim 1, wherein the display controller further configured to control the display to rearrange and display the at least two or more images and other images representing files in accordance with a predetermined criterion while maintaining a relative positional relationship among the at least two or more images and keeping the at least two or more images displayed.

3. An information processing method comprising:
   controlling a display to display a plurality of images representing respective files;
   accepting an operation for selecting at least two or more images from among the plurality of images; and
   forming a first group by associating a plurality of files represented by the at least two or more images with one another with the at least two or more images kept displayed on the display in a case where the operation has been accepted,
   wherein the operation of controlling the display further comprises:

controlling the display to display multiple frames surrounding an image representing a file in a case where the file belongs to multiple groups, and wherein the controlling the display further comprises:

controlling the display to display relationship information indicating that, among the plurality of files, two or more files that satisfy a predetermined condition have a relationship and to display relationship type information indicating a type of the relationship in association with the relationship information.

4. A non-transitory computer readable medium storing a program causing a computer to execute a process for information processing, the process comprising:

controlling a display to display a plurality of images representing respective files;

accepting an operation for selecting at least two or more images from among the plurality of images; and forming a first group by associating a plurality of files represented by the at least two or more images with one another with the at least two or more images kept displayed on the display in a case where the operation has been accepted, wherein the operation of controlling the display further comprises:

controlling the display to display multiple frames surrounding an image representing a file in a case where the file belongs to multiple groups, and wherein the controlling the display further comprises:

controlling the display to display relationship information indicating that, among the plurality of files, two or more files that satisfy a predetermined condition have a relationship and to display relationship type information indicating a type of the relationship in association with the relationship information.

* * * * *